United States Patent [19]

Freund

[11] Patent Number: 5,105,908

[45] Date of Patent: Apr. 21, 1992

[54] LADDER TREESTAND AND TRAILER RIT

[75] Inventor: Harvey J. Freund, Crystal, Minn.

[73] Assignee: Westwood Ridge Enterprises, Crystal, Minn.

[21] Appl. No.: 640,146

[22] Filed: Jan. 11, 1991

[51] Int. Cl.⁵ .......................................... A01M 31/02
[52] U.S. Cl. ..................................... 182/20; 182/116; 182/127; 182/129; 182/187
[58] Field of Search ................. 182/116, 187, 188, 20, 182/21, 127, 129

[56] References Cited

U.S. PATENT DOCUMENTS

| | | | |
|---|---|---|---|
| 1,244,325 | 10/1917 | Hanlon | 182/16 |
| 3,282,375 | 11/1966 | Ray | 182/116 |
| 3,289,787 | 12/1966 | McSwain | 182/20 |
| 3,336,999 | 8/1967 | McSwain | 182/116 |
| 4,045,040 | 8/1977 | Fails | 182/20 |
| 4,428,456 | 1/1984 | Rohde | 182/20 |
| 4,442,919 | 4/1984 | Fulcher | 182/127 |
| 4,742,888 | 5/1988 | Amacker | 182/116 |
| 4,787,476 | 11/1988 | Lee | 182/116 |
| 4,905,792 | 3/1990 | Wilson | 182/116 |
| 5,016,732 | 5/1991 | Dunn | 182/116 |

OTHER PUBLICATIONS

Outdoor Life, Sep., 1985, N.M.B. Inc. ad.
Bow Hunter, May, 1986, Reiten Game Cart ad.
Gander Mountain, 1988, Apache ad.
Tree Transformer ad.
North American Whitetail, Nov., 1989, The Forrester Plantation 1000.
Cabela's, Fall 1989, p. 140, the Loc-On Treestand.
Cabela's, Fall 1989, p. 142, the Ocala Ladder Stand.

Primary Examiner—Reinaldo P. Machado
Attorney, Agent, or Firm—James W. Miller

[57] ABSTRACT

A ladder treestand comprises a main ladder section and an auxiliary ladder section that can be coupled to the main section on either the top or the bottom thereof to serve either as a gun rest or to alternatively increase the ladder height. In addition, a trailer kit may be used to convert the ladder treestand into a towable trailer that may be connected to a motorized vehicle. This allows the treestand to be more easily transported into and out of the hunting area, and to be used as a litter for transporting game.

25 Claims, 2 Drawing Sheets

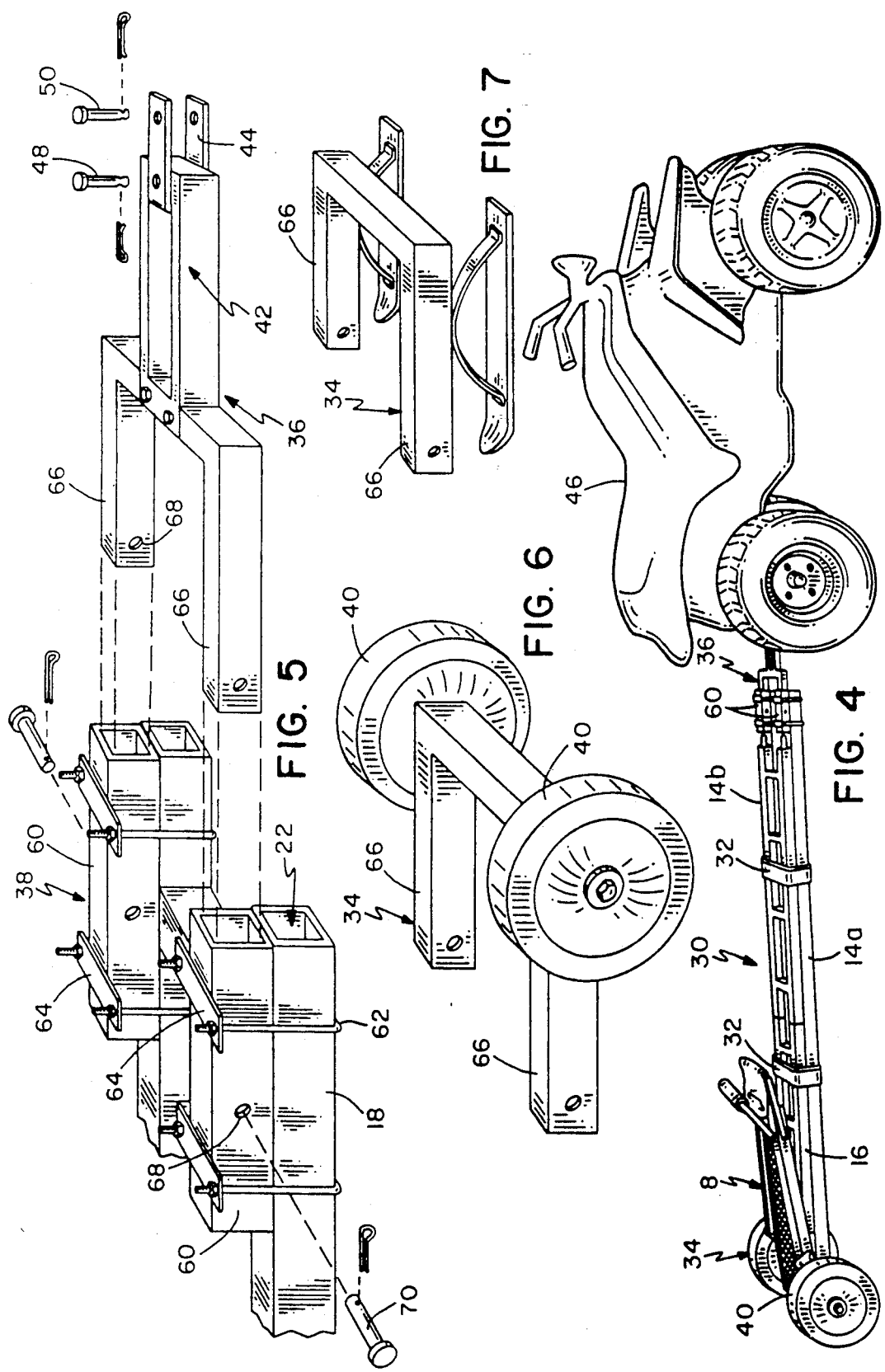

LADDER TREESTAND AND TRAILER KIT

TECHNICAL FIELD

The present invention relates to a ladder type treestand for supporting a hunter above the ground. More particularly, the present invention relates to such a treestand which may be easily converted into a towable trailer and which has various sections that may be connected in different ways, all to enhance the treestand's versatility.

BACKGROUND OF THE INVENTION

Ladder type treestands are well known in the sport of hunting. Typically, such treestands comprise a ladder which carries a support platform at one end. The ladder is usually made in various sections that are connected together to form the complete ladder but which are otherwise broken down to allow the ladder to be carried on the hunter's back. In any event, when the ladder is assembled and erected, the support platform is located at the top of the ladder and abuts against the tree. The ladder extends upwardly from the ground to the platform to allow the hunter to climb up to the platform. Various rods and support straps can extend between the ladder and the tree to help brace and support the structure.

Prior treestands of this type are difficult to transport into or out of the hunting area. While stands made from separable sections can be carried in on the hunter's back, this can be difficult and tiring to do, especially over long distances. Another problem is transporting game taken by the hunter out of the hunting area. Since these treestands are often used in hunting relatively large animals, such as deer, it can be very difficult to remove such large animals. It is impractical or impossible to carry this type of game out.

Separate wheeled carts have been provided for helping remove game. Such carts are often collapsible, have a set of wheels which allow them to be pulled over the ground, and provide a support platform on which the game may be deposited. The carts are provided with handles to allow the hunter to pull the cart in a rickshaw fashion out of the hunting area after the game is loaded onto the cart. The carts are also used to help transport hunting gear and other equipment as well.

One manufacturer of a collapsible ladder treestand also sells an accessory comprising two ladder wheels that may be attached to one of the ladder sections of the treestand. Thus, when the treestand is broken down, the wheeled ladder section can be used as a wheeled cart in much the same way as the carts previously discussed. In other words, the wheeled section is simply manually pulled by the hunter who holds onto the side rails of the ladder section with the game being deposited on the ladder section.

The prior methods of transporting game, while useful to some degree, have their disadvantages. For one thing, using a separate wheeled cart requires the hunter to purchase another piece of equipment, namely the cart, that is itself bulky, expensive and hard to store. While the above noted accessory wheels for the treestand avoids this disadvantage as it uses one of the ladder sections as the cart, it nonetheless has some disadvantages of its own. For example, the wheels appear to be permanently mounted to the ladder section and remain on the ladder even when the ladder is erected and in use, thus obstructing the hunter's path up and down the ladder. In addition, the wheels are designed for only a particular brand of ladder treestand requiring a unique and relatively permanent attachment method. The wheels do not fit other ladder type treestands without significant modification to the ladders, e.g. drilling mounting holes and the like in the ladders.

Finally, and most importantly, both the wheeled carts and the wheeled treestands previously known are suited only for manual use, i.e. they both need to be manually pulled in and out of the hunting area by the hunter. If weather conditions are adverse, i.e. the ground is muddy or somewhat snowy, this can be most difficult or even impossible to do. Even when weather conditions for the use of these products are ideal, it is still quite tiring for the hunter to have to pull these devices any appreciable distance. Thus, an easier and more convenient way of transporting items, such as the treestand itself and/or game, into and out of the hunting area is needed.

Another problem with prior treestands is the need to provide a gun rest and/or guard rail at the top of the stand adjacent the hunting platform. Separate gun rests have been provided for this location, but they have comprised additional specialized pieces which have only a single purpose, namely as only the gun rest. A simpler and less complex design is desirable for providing a gun rest.

SUMMARY OF THE INVENTION

It is an aspect of this invention to provide a trailer kit for converting a hunting stand into a towable trailer. The hunting stand includes a ladder having a pair of longitudinal side rails spanned by a plurality of longitudinally spaced, transverse ladder rungs. The kit comprises a transport frame having ground engaging means for decreasing friction with the ground, a tow frame having hitch means for connecting the tow frame to a motorized vehicle and attachment means for detachably affixing the transport frame and the tow frame to the ladder in a spaced apart orientation along the ladder's length. Thus, the hunting stand is converted into a trailer that may be towed into and out of the hunting area using the motorized vehicle.

Another aspect of this invention comprises a hunting stand made from a plurality of ladder sections which are separable one from the other but which include means for interlocking the sections together to form a ladder which the hunter may use to climb above the ground. The sections include at least two sections comprising a main section and an auxiliary section. Platform means for supporting a hunter is carried at or near one end of the main section to locate the platform means above the ground when the ladder sections are interlocked together and the ladder is erected with the one end of the main section being raised higher than the other end of the main section. The interlocking means is provided at each end of the main section to allow the auxiliary section to be selectively coupled to either end of the main section, whereby the auxiliary section can be placed either in a first position at the one end of the main section to extend upwardly above the platform means or in a second position at the other end of the main section to raise the main section above the ground by the height of the auxiliary section.

BRIEF DESCRIPTION OF THE DRAWINGS

The present invention will be described in more detail in the following Detailed Description, taken in conjunction with the following drawings, in which like reference numerals refer to like elements throughout.

FIG. 4 is a perspective view of the treestand shown in FIG. 1, particularly illustrating the treestand having been converted into a trailer that may be towed by a motorized vehicle;

FIG. 5 is a perspective view of certain of the components of a trailer kit for converting the treestand shown in FIG. 1 to the trailer shown in FIG. 4, the kit components shown comprising the tow frame and the attachment means for detachably affixing the tow frame to one of the ladder sections of the treestand;

FIG. 6 is a perspective view of certain other components of the trailer kit for converting the treestand shown in FIG. 1 to the trailer shown in FIG. 4, the other components shown comprising the transport frame; and FIG. 7 is a perspective view generally similar to that shown in FIG. 6, particularly illustrating another embodiment of the transport frame of the trailer kit of the present invention.

DETAILED DESCRIPTION

Figures 1, 2, 3:
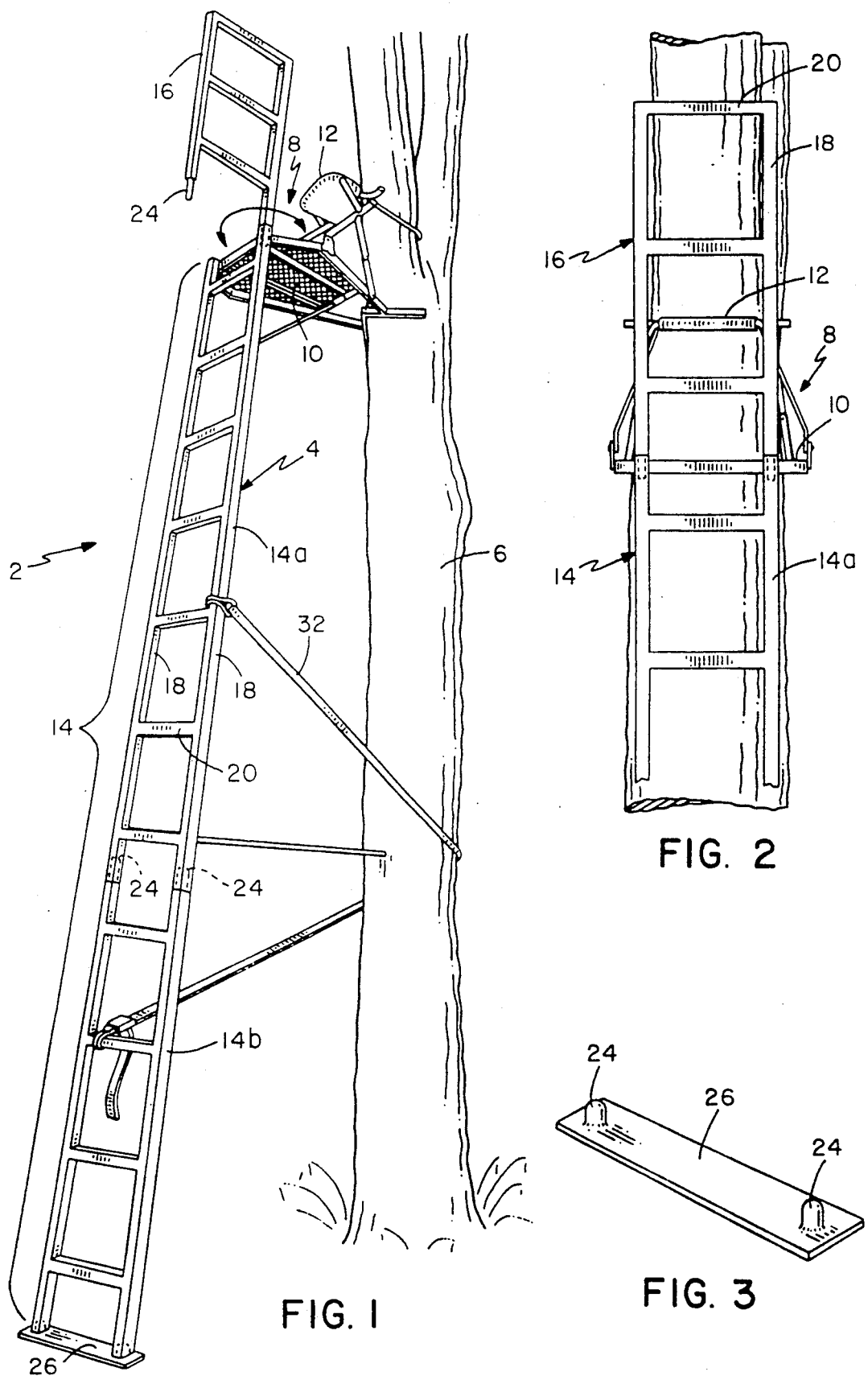
FIG. 1 is a perspective view of an improved treestand according to this invention, particularly illustrating a treestand having an auxiliary ladder section secured to the top of a main ladder section, with the auxiliary ladder section being shown in an open position allowing the hunter to have access to the support platform carried at the top of the main ladder section.
FIG. 2 is a partial front elevational view of the treestand shown in FIG. 1, particularly illustrating the auxiliary ladder section in a closed position at the top of the main ladder section in which the auxiliary ladder section acts as a gun rest and/or guard rail for a hunter who is seated on the support platform.
FIG. 3 is a perspective view of a portion of the treestand shown in FIG. 1, namely of a separate load bearing plate adapted to be secured to the bottom of the main ladder section to help support the treestand on the ground.

Referring first to FIGS. 1-3, a ladder treestand according to the present invention is shown generally as 2. Treestand 2 includes a ladder 4 designed to be erected and propped up against a tree 6 as shown in FIG. 1. A support platform 8 is carried on ladder 4 at or near its top and in use is abutted against tree 6. As shown in FIG. 1, support platform 8 includes a floor 10 and a seat 12 located above floor 10 when support platform 8 is fully expanded, support platform 8 normally be collapsible during transport. Other types and styles of support platforms could be used in place of platform 8, e.g. platforms with or without seats, etc. Thus, the specific type of support platform 8 does not form part of the present invention.

Ladder 4 is preferably made from three separate ladder sections: a first relatively long section 14a of approximately 7 feet, a second shorter section 14b of approximately 4 feet, and a third and shortest section 16 of approximately 3 feet. Interlocking means to be described hereafter are used to couple ladder sections 14 and 16 together and thereby form the complete ladder 4. Support platform 8 is pivotally carried on one end of the first and longest ladder section 14a. Thus, support platform 8 is pivotal relative to ladder section from a first collapsed position laid flat against ladder section 14a, as shown in FIG. 4, to the normal use position extending outwardly at right angles to ladder section 14a, as shown in FIG. 1.

Ladder sections 14a and 14b are normally assembled together with first section 14a being located on top of second section 14b. This arrangement locates support platform 8 at the top of ladder 4 with ladder 4 having an approximate height of 11 feet, e.g. 11 feet from th ground to support platform 8. In this assembled relationship, the sections 14a and 14b form what will be referred to herein as "main" ladder section 14, the sections 14a and 14b forming in effect sub-sections of main ladder section 14. Whenever the "main section 14" or "ladder section 14" is referred to herein, without having the a or b suffix following the numeral 14, the combination of the assembled sub-sections 14a and 14b is being referred to rather than the separate sub-sections. The remaining ladder section 16, i.e. the third and final section, is desirably couplable to main section 14 in different ways, as will be described in more detail hereafter. Because the relationship of third section 16 can be selectively changed relative to main section 14, which is one novel aspect of treestand 2 of this invention, the third section 16 will be referred to herein as the "auxiliary" ladder section.

Various means of interlocking the various ladder sections together can be used. For example, each ladder section 14a, 14b or 16 comprises two, longitudinal side rails 18 separated by transverse, longitudinally spaced ladder rungs 20. The ladder sections can be made from a conventional metal ladder having hollow tubes forming the side rails 18. In this event, the ends of the side rails 18 on each section can be left open to form sockets 22. See FIG. 5. At least some of the ends of certain of the ladder sections are provided with longitudinal pins 24 designed to fit into such sockets 22. For example, one end of second section 14b is provided with pins 24 to be received inside the side rails at the lower end of first section 14a. Similarly, one end of auxiliary section 16 is also provided with such pins 24. See FIG. 1.

The ladder sections can be assembled together in various ways. Normally, first section 14a and second section 14b are coupled together to form the main ladder section 14 as shown in FIG. 1 by pushing second section 14b into engagement with what will be the lower end of first section 14a. Then, the user has a choice of where to place auxiliary section 16. Auxiliary section 16 can be placed either at the top or the bottom of main section 14.

FIGS. 1 and 2 illustrate auxiliary section 16 in a first position thereof at the top of main section 14. Auxiliary section 16 be placed in this first position by dropping pins 24 on auxiliary section 16 down into the open upper ends or sockets 22 of the side rails of main section 14. This would normally be done after ladder 4 is erected with the hunter carrying auxiliary section 16 up ladder 4. Furthermore, auxiliary section 16 in its first position can have either an open orientation in which it is at right angles to support platform 8 to allow the hunter to enter or leave platform 8 during the day, as shown in FIG. 1, or a closed orientation in which it is in line with main section 14 and extends across the front of support platform 8. The hunter can selectively move auxiliary section 16 between its closed and open orientations whenever he desires to depart support platform 8.

In its first location at the top of main section 14, and most effectively in its closed orientation shown in FIG. 2, auxiliary section 16 forms a gun rest and/or guard rail for a hunter who is sitting or standing on support platform 8. The gun rest function is provided by any of the ladder rungs 20 of auxiliary section 16 on which the hunter can rest and steady his weapon. When auxiliary section 16 is used in this first location, an additional ground engaging plate 26 shown in FIG. 3 is desirably used on the lower end of main section 14. Plate 26 has two interlocking pins 24 extending up from one side thereof. Pins 24 can be slipped upwardly into the open lower ends of side rails 18 of second section 14b to provide a flat bearing surface for ladder 4 and otherwise prevent ladder 4 from sinking down into the ground.

Alternatively, auxiliary section 16 could be used in a second position at the lower end of main section 14. In this regard, auxiliary section 16 would be inverted from the position shown in FIG. 1 to now extend with its pins 24 facing upwardly to be received in the open lower ends of side rails 18 of second section 14b, with ground engaging plate 26 first being removed. This allows the hunter to modify treestand 2 to get some extra height when that is preferred or desirable. Auxiliary section 16 in this second position obviously cannot function as a guard rest or gun rail as it does in its first position But, this use can be sacrificed in those instances where a longer ladder 4 is required. The end of auxiliary section 16 opposite to pins 24 has a closed face defined by one of the transverse ladder rungs 20. In the second position of auxiliary section 16, this ladder rung serves as the load bearing surface in place of the ground engaging plate 26.

Accordingly, a treestand 2 according to the present invention is versatile in use. It allows the hunter to select a treestand of different heights or it allows a somewhat shorter stand to be used with the auxiliary section 16 then conveniently forming a gun rest and/or guard rail. Thus, a separate gun rest is not needed, making treestand 2 less complex and easier to use and manufacture.

Referring now to FIGS. 3-6, treestand 2 is also adapted for use as a towable trailer, illustrated generally as 30, to more easily remove game and or transport treestand 2 into and out of the hunting area. In this regard, first ladder section 14a, i.e. the longest section, comprises the section of ladder 4 which is used to form the trailer. As shown in FIG. 4, the remaining ladder sections, i.e. sections 14b and 16, are simply laid on top of first section 14a and secured thereto with the flexible tie down straps 32 normally used to help brace the treestand.

More specifically, the present invention contemplates that a trailer kit will be provided for converting any ladder treestand, and not just treestand 2 shown herein, into the towable trailer 30. This kit includes three major sets of components: a transport frame 34, a tow frame 36, and attachment means 38 for detachably coupling the transport and tow frames 34 and 36 to opposite ends of ladder section 14a. For convenience, the various components of trailer kit 24 will be described separately.

Transport frame 34 includes some type of ground engaging means which decreases friction with the ground to facilitate movement of the frame over the ground. As shown in FIG. 5, this ground engaging means preferably comprises two transversely spaced wheels 40 rotatably supported on the transport frame in any suitable manner, e.g. by being mounted on the ends of an axle. Wheels 40 obviously support transport frame 34 for a rolling movement over the ground. However, transport frame 34 could use skis in place of the wheels 40 when transport frame needs to traverse snow covered ground. Alternatively, two transport frames 34 could be provided with one frame having a set of skis permanently mounted thereon and the other frame having a set of wheels 40 permanently mounted thereon. The transport frame with skis would be used in snowy areas and the wheeled transport frame would be used in areas where no snow cover is present.

Tow frame 36 includes a hitch means 42 which allows tow frame 36 to be coupled to a motorized vehicle 46. As shown herein, hitch means 42 comprises a U-shaped clevis 44 secured to a crossmember on tow frame 36 by a connecting pin 48. The outer end of clevis 44 passes over the hitch tongue normally provided on vehicle 46 and is secured to vehicle 46 by a hitch pin 50. The type of hitch means used on tow frame 36 will depend on the type of vehicle 46 provided and the type of hitch on that vehicle 46. Hitch means 42 as shown herein is suitable for connection to a four wheel all terrain vehicle of the type used in off road activities. However, both the type of vehicle 46 and the type of hitch means 42 used could obviously change.

The attachment means 38 used for coupling the transport and tow frames to the treestand comprises two pairs of tubular attachment members 60 that are clamped to the outside of side rails 18 of ladder section 14a by U-shaped bolts 62 and clamping plates 64. One pair of attachment members 60 is located at or adjacent one end of ladder section 14a and the other pair of attachment members 60 is located at or adjacent the opposite end of ladder section 14a. The attachment members telescopically receive two transversely spaced connecting posts or members 66 provided on transport frame 34 and tow frame 36. Thus, transport frame 34 is coupled to one pair of attachment members 60 by inserting connecting members 66 inside attachment members 60, with tow frame 36 being coupled to the other pair of attachment members 60 in a similar manner. Holes 68 are provided in the attachment members 69 and the connecting members 66 which holes 68 will become aligned when the telescopic fit has been properly made. Locking pins 70 are then inserted through the aligned holes 68 to releasably but firmly lock transport and tow frames to ladder section 14a to form the trailer.

One aspect of the present invention contemplates that transport frame 34, tow frame 36, four attachment members 60 and their associated bolts 62 and clamping plates 64, and the various connecting and hitch pins, will be sold together as a kit. They can be used to convert any ladder treestand into a wheeled and towable trailer. That is done by placing attachment members 60 at each end of at least one ladder section of treestand 2, normally the longest section if treestand 2 has multiple sections, and securing attachment members 60 to the side rails using the bolts and clamping plates. Normally, attachment members 60 can be permanently left on that ladder section, though such permanent mounting is not absolutely required.

Then, whenever it is desired to take stand 2 into the hunting area, the transport and tow frames 34 and 36 can be quickly and easily secured to opposite ends of the ladder section. This is done simply by sliding connecting members 66 into attachment members 60 and locking them in place with locking pins 70. Hitch means 42 provided on tow frame 36 can then be coupled to the hitch of the motorized vehicle 46. Vehicle 46 can then be driven into the hunting area, thus easily transporting treestand 2 without much effort over even long distances. Treestand 2 can also serve as a litter to help carry in the hunter's gear, by lashing it to the top of ladder section 14a in the manner in which the other ladder sections 14b and 16 are carried, or for use in transporting game out of the hunting area. Once treestand 2 arrives at a desired location, the tow and transport frames 34 and 36 can be easily removed from ladder section 14a by uncoupling locking pins 70 and sliding the frames 34 and 36 out of attachment members 60. Thus, ladder sections 14a, 14b and 16 can then be coupled together in a normal fashion with ladder treestand 2 being erected and used normally.

A ladder treestand 2 which comprises a trailer that can be towed by a motorized vehicle is obviously desirable. It allows easy transport of the stand itself, and of items such as game that can be carried on the stand when used as trailer, in and out of the hunting area. Moreover, by making the trailer components as a kit, they can be adapted for use with any existing ladder type treestand, regardless of the exact design of such a treestand. Thus, such a trailer kit would have wide use.

Various modifications of this invention will be apparent to those skilled in the art. Thus, the scope of this invention is to be limited only by the appended claims.

I claim:

1. A trailer kit for converting a hunting stand into a towable trailer, the hunting stand including a ladder having a pair of longitudinal side rails spanned by a plurality of longitudinally spaced, transverse ladder rungs, which comprises:
   (a) a transport frame having ground engaging means for decreasing friction with the ground;
   (b) a two frame having hitch means for connecting the tow frame to a motorized vehicle; and
   (c) attachment means for detachably affixing the transport frame and the tow frame to the ladder in a spaced apart orientation along the ladder's length, whereby the hunting stand is converted into a trailer that may be towed into and out of the hunting area using the motorized vehicle, wherein the attachment means comprises:
      (i) two pairs of attachment members, wherein a first attachment member in each pair is suited for being abutted against one side rail and the second attachment member in each pair is suited for being abutted to the other side rail generally in longitudinal alignment with the first attachment member of that pair, wherein the pairs of attachment members are adapted to be spaced apart relative to one another along the length of the side rails of the ladder;
      (ii) means for securing the attachment members to the side rails;
      (iii) two pairs of connecting members, wherein a first pair of connecting members is carried on the transport frame and a second pair of connecting members is carried on the tow frame, wherein the connecting members in each pair are shaped to have a telescopic fit with the attachment members of each pair to allow the transport frame to be coupled to one pair of the attachment members and the tow frame to the other pair of attachment members; and
      (iv) means for locking the connecting members to the attachment members after they are telescopically interfit together.

2. A trailer kit as recited in claim 1, wherein the ground engaging means comprises at least one wheel rotatably carried on the transport frame to allow the transport frame to roll over the ground.

3. A trailer kit as recited in claim 2, wherein the ground engaging means comprises a pair of transversely spaced wheels carried on the transport frame.

4. A trailer kit as recited in claim 1, wherein the ground engaging means comprises at least one ski carried on the transport frame to allow the transport frame to be more easily pulled over snow.

5. A trailer kit as recited in claim 1, wherein the attachment member securing means comprises means for clamping the attachment members against the side rails.

6. A trailer kit as recited in claim 5, wherein the clamping means comprises:
   (a) a plurality of clamping plates, wherein each clamping plate is suited for being abutted against each attachment member after that attachment member has been abutted against the side rail; and
   (b) fastening means for pulling the clamping plate towards the side rail to sandwich the attachment member between the clamping plate and the side rail to hold the attachment member in place.

7. A trailer kit as recited in claim 6, wherein the fastening means comprises:
   (a) a plurality of U-shaped bolts having spaced, parallel legs each of which includes a threaded outer portion, wherein each bolt is suited to be placed around the side rails and the attachment member abutted thereto such that the legs of each bolt extend upwardly past each side of the side rails and the attachment member with the outer portion thereof extending upwardly past the attachment member to pass through a hole in the clamping plate; and
   (b) a plurality of nuts suited for being received on the threaded outer portions of the bolt legs to bear against the clamping plates when the nuts are tightened on the bolt legs.

8. A trailer kit as recited in claim 1, wherein the locking means comprises:
   (a) at least one hole provided in each attachment member and connecting member, wherein the holes in each attachment member may be aligned with the holes in the connecting members when the attachment and connecting members are interfit together; and
   (b) a plurality of connecting pins, wherein a single pin is suited for being inserted through one set of aligned holes in the attachment and connecting members to releasably lock the attachment and connecting members together.

9. A hunting stand for use by a hunter, which comprises:
   (a) a ladder having a pair of longitudinal side rails spanned by a plurality of longitudinally spaced, transverse ladder rungs, wherein the ladder is made from a plurality of separable sections which include means for interlocking the sections together to form the ladder;
   (b) platform means carried on the ladder for supporting a hunter above the ground when the ladder is erected;

(c) ground engaging means for decreasing friction with the ground, wherein the ground engaging means is attached to the ladder at a first location thereon; and (d) hitch means for coupling to a motorized vehicle, wherein the hitch means is attached to the ladder at a second location which is sufficiently spaced from the first location along the length of the ladder to allow the ladder to be laid flat and used as a trailer when not being used as a hunting stand, whereby the hitch means allows the ladder to be towed into and out of the hunting area using the motorized vehicle with the ladder being supported for movement over the ground by the ground engaging means, wherein the ground engaging means and hitch means are carried on the same one of the ladder sections.

10. A hunting stand as recited in claim 9, wherein the ladder sections include at least two sections that have different lengths, wherein the ground engaging means and hitch means are carried on the longest of the ladder sections.

11. A hunting stand as recited in claim 9, wherein the ground engaging means is carried on a transport frame, wherein the hitch means is carried on a tow frame, and further including attachment means for detachably affixing the transport frame and the tow frame to the ladder, whereby the hunting stand may be temporarily converted into the towable trailer.

12. A hunting stand, which comprises:

(a) a plurality of ladder sections which are separable one from the other but which include means for interlocking the sections together to form a ladder which the hunter may use to climb above the ground, wherein the sections include at least two sections comprising a main section and an auxiliary section;

(b) platform means for supporting a hunter, wherein the platform means is carried at or near one end of the main section to locate the platform means above the ground when the ladder sections are interlocked together and the ladder is erected with the one end of the main section being raised higher than the other end of the main section; and (c) wherein the interlocking means is provided at each end of the main section to allow the auxiliary section to be selectively coupled to either end of the main section, whereby the auxiliary section can be placed either in a first position at the one end of the main section to extend upwardly above the platform means or in a second position at the other end of the main section to raise the main section above the ground by the height of the auxiliary section.

13. A hunting stand as recited in claim 12, wherein the auxiliary section is substantially shorter than the main section.

14. A hunting stand as recited in claim 12, wherein the ladder sections each comprise spaced, longitudinal side rails separated by one or more transverse ladder rungs, wherein the side rails of the main section are provided with a first portion of the interlocking means at each end thereof and the side rails of the auxiliary section are provided with a second portion of the interlocking means on at least one thereof, and wherein the first and second portions of the interlocking means mate with one another to secure the ladder sections together.

15. A hunting stand as recited in claim 14, wherein the second portion of the interlocking means is provided only on the one end of the auxiliary section, and wherein the auxiliary section includes a transverse ladder rung at the other end thereof to form a closed face for the other end of the auxiliary section, whereby the closed face is located as the topmost point of the ladder when the auxiliary section is placed in its first position and is located as the lowermost point of the ladder when the auxiliary section is placed in its second position to thereby act as a load bearing surface to help support the ladder on the ground.

16. A hunting stand as recited in claim 14, wherein the two portions of the interlocking means comprise pin and socket connections.

17. A hunting stand as recited in claim 16, wherein the sockets are located at each end of the main section, and wherein the pins are located at the one end of the auxiliary section, wherein the pins and sockets extend in the longitudinal directions of the side rails with the pins being sized to be received within the sockets when the ladder sections are abutted together.

18. A hunting stand as recited in claim 17, wherein the side rails of the main section are hollow and are open at each end of the main section, wherein the sockets are formed by the hollow, open ends of the side rails at each end of the main section.

19. A hunting stand as recited in claim 12, further including a load bearing plate also having the ladder section interlocking means attached thereto, whereby the interlocking plate can be attached to the other end of the main section to help support the ladder on the ground when the auxiliary section is coupled to the one end of the main section.

20. A hunting stand as recited in claim 12, wherein the main section comprises one or more separable sub-sections each having the ladder section interlocking means attached thereto for holding the sub-sections together to form the main section.

21. A trailer kit for attachment to a pair of longitudinally extending members, which comprises (a) a transport frame having ground engaging means for decreasing friction with the ground; and (b) attachment means for detachably affixing the transport frame to the longitudinal members, whereby the longitudinal members may be converted into a trailer which may be more easily moved over the ground, wherein the attachment means comprises:

(i) a first pair of attachment members, wherein a first attachment member in the first pair is suited for being abutted against one longitudinal member and the second attachment member in the first pair is suited for being abutted to the other longitudinal member generally in longitudinal alignment with the first attachment member of the first pair;

(ii) means for securing the attachment members of the first pair to the longitudinal members;

(iii) a first pair of connecting members carried on the transport frame, wherein the connecting members of the first pair are shaped to have a telescopic fit with the attachment members of the first pair to allow the transport frame to be coupled to the first pair of the attachment members; and (iv) means for locking the connecting members of the first pair to the attachment members of the first pair after they are telescopically interfit together.

22. A trailer kit as recited in claim 21, further including:
(a) a tow frame having hitch means for connecting the two frame to a motorized vehicle; and
(b) attachment means for detachably affixing the tow frame to the longitudinal members in a spaced apart orientation along the length of the longitudinal members from the attachment means used to secure the transport frame to the longitudinal members, whereby the hunting stand is converted into a trailer that may be towed into and out of the hunting area using the motorized vehicle, wherein the tow frame attachment means comprises:
(i) a second pair of attachment members, wherein a first attachment member in the second pair is suited for being abutted against one longitudinal member and the second attachment member in the second pair is suited for being abutted to the other longitudinal member generally in longitudinal alignment with the first attachment member of the second pair, wherein the first and second pairs of attachment members are adapted to be spaced apart relative to one another along the length of the longitudinal members;
(ii) means for securing the attachment members of the second pair to the longitudinal members;
(iii) a second pair of connecting members carried on the two frame, wherein the connecting members are shaped to have a telescopic fit with the attachment members of the second pair to allow the tow frame to be coupled to the second pair of the attachment members; and
(iv) means for locking the connecting members of the second pair to the attachment members of the second pair after they are telescopically interfit together.

23. A trailer kit as recited in claim 21, wherein the attachment member securing means comprises means for clamping the attachment members against the longitudinal members.

24. A trailer kit as recited in claim 23, wherein the clamping means comprises:
(a) a plurality of clamping plates, wherein each clamping plate is suited for being abutted against each attachment member after that attachment member has been abutted against the longitudinal member; and
(b) fastening means for pulling the clamping plate towards the longitudinal member to sandwich the attachment member between the clamping plate and the longitudinal member to hold the attachment member in place.

25. A trailer kit as recited in claim 24, wherein the fastening means comprises:
(a) a plurality of U-shaped bolts having spaced, parallel legs each of which includes a threaded outer portion, wherein each bolt is suited to be placed around the longitudinal members and the attachment member abutted thereto such that the legs of each bolt extend upwardly past each side of the longitudinal members and the attachment member with the outer portion thereof extending upwardly past the attachment member to pass through a hole in the clamping plate; and
(b) a plurality of nuts suited for being received on the threaded outer portions of the bolt legs to bear against the clamping plates when the nuts are tightened on the bolt legs.

* * * * *